United States Patent [19]

Farelli

[11] 3,860,249
[45] Jan. 14, 1975

[54] CASINGS FOR TAPPET RODS PARTICULARLY IN THE MOTOR VEHICLE ENGINES

[76] Inventor: Mario Farelli, Corso Giulio Cesare 298, Turin, Italy

[22] Filed: Mar. 16, 1973

[21] Appl. No.: 340,607

[52] U.S. Cl................. 277/63, 123/90.38, 277/164
[51] Int. Cl............................................ F16j 15/12
[58] Field of Search ............... 277/164, 102, 58, 63; 123/90.19, 90.33, 90.37, 90.38, 188 AF

[56] References Cited
UNITED STATES PATENTS

| | | | |
|---|---|---|---|
| 2,657,679 | 11/1953 | Powell | 123/90.38 |
| 2,963,012 | 12/1960 | Kolbe | 123/90.38 |

Primary Examiner—Richard E. Aegerter
Assistant Examiner—Robert I. Smith
Attorney, Agent, or Firm—Breitenfeld & Levine

[57] ABSTRACT

A casing for the tappet rods of a motor vehicle engine is made with smooth cylindrical ends, instead of with the conventional corrugated ends. The casing is formed with a retaining-flange near each end, and an annular resilient gasket is placed around the casing between each flange and the seat into which the respective end of the casing is inserted. Each flange may be flat or may diverge outwardly from the casing toward the end thereof to which it is closest. The gaskets may have many different shapes, including an X-shaped outline, a concave external surface, a corrugated external surface, corrugated external and internal surfaces, a cylindrical outer surface. The gasket may have a helical coiled spring embedded in it.

9 Claims, 10 Drawing Figures

PATENTED JAN 14 1975
3,860,249
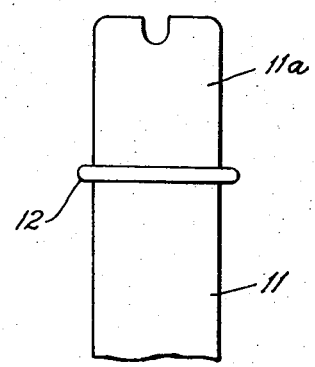
FIG.1
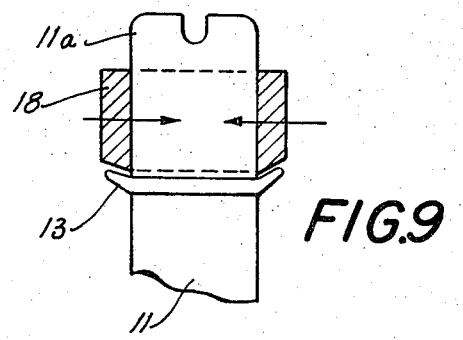
FIG.9
FIG.2
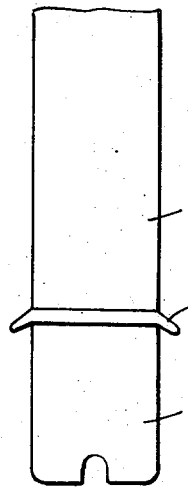
FIG.3
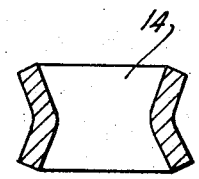
FIG.4
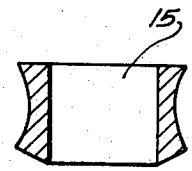
FIG.5
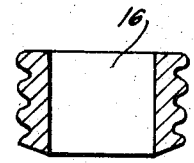
FIG.6
FIG.7
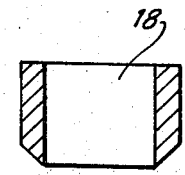
FIG.8
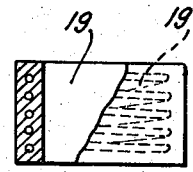
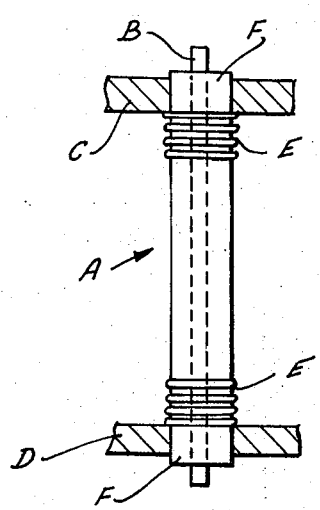
FIG.10 (PRIOR ART)

CASINGS FOR TAPPET RODS PARTICULARLY IN THE MOTOR VEHICLE ENGINES

In some types of endothermic engines for motor vehicles, the distribution control is effected through rods which transmit the movement of the camshaft to the rockers which control the valves.

In the engines comprising tappet rods which transmit to the rockers the reciprocating movement imposed by the camshaft, said tappet rods are enclosed within cylindrical casings mounted between the upper and the lower part of the engine; said casings, longitudinally accommodating the rods, are mounted with their ends inserted in corresponding seats, in oil sealing relation therewith. In order to longitudinally absorb the distance variations which occur between the two parts connected in oil sealing relation, due to the engine temperature variations, the end portions of said casings, which are metallic and form conduits for the circulation of the lubricating fluid, are corrugated, that is, formed as a bellows in order to resiliently compensate for the variations occurring in the distance between the connected parts.

This known and largely used arrangement which, for instance, in the "500 FIAT" motor vehicle needs the use of five casings, mounted between the crankcase supporting the camshaft and the cylinder head supporting the rockers, presents some drawbacks mainly deriving from the molecular alteration of the metallic material used and caused by the continuous thermic variations to which the metal forming the casings is subjected. In the mentioned case of said five casings, four contain the four tappet rods corresponding to four valves of the engine, while the fifth forms a way for return of the oil to the oil sump.

It is obvious that, due to the known structure with corrugated ends of said casings, when those ends lose the capability to resiliently adapt to the different use conditions, considerable oil losses occur with negative consequences.

In order to obviate the said drawbacks, the subject matter of the present invention is an improvement relating to said casings, characterized in that the opposite ends of each casing present a cylindrical smooth skirt instead of corrugated and are provided, at a suitable height, with retaining flanges suitable to serve as supports for resilient gaskets which have a collar shape and are intended to be mounted between each flange and the plane of the element, cylinder head or crankcase, within which the protruding ends of same casing are inserted; said collar shaped gaskets, made of natural or synthetic rubber or other suitable plastics having a great elasticity and thermal endurance, having the object to serve as effective seal elements for the lubricating fluid, allowing at the same time great economy in the construction of the casings for the tappet rods wherein the machining of the corrugated ends is avoided and consequently the casings may be made with a more strong metal which, due to the casing shape, may be a material with no resilient deformation capability in the longitudinal direction.

More clear features of the improvement will appear from the following specification and the accompanying drawings, which are only illustrative and wherein:

FIGS. 1 and 2 represent the ends of a casing according to the invention;

FIGS. 3 to 8 are diametral cross sections of the different types of gaskets, which may be mounted on the ends of casings of FIGS. 1 and 2;

FIG. 9 illustrates the end of a casing provided with a gasket and;

FIG. 10 illustrates schematically the assembling of a casing in its operating seat.

As represented in FIG. 10, the casing A, longitudinally accommodates a tappet rod B, is mounted between fixed parts C, D of the engine, with the ends F inserted within suitable seats and the corrugated collars E bearing against the edge of said seats and serving to confer to the casing A a remarkable elasticity in the longitudinal direction.

According to the improvement of the invention, casing 11, FIGS. 1 and 2, has its skirt completely cylindrical even at its ends 11a which will be fixedly inserted in the seats; opposed flanges 12, 13 are provided at a suitable height and may have a plane edge as flange 12 or a slanting edge as flange 13. At each end 11a of the casing 11, a collar shaped gasket of the type represented on FIGS. 13 to 18 is slipped on.

The body of said collar shaped gaskets, mounted between the flange 12 and/or 13 and the edge of the seats formed in the parts C, D, is made of a suitable oil resisting rubber or a suitable plastic material having a considerable elasticity and heat endurance. The assembling of casings 11 is obviously made when the engine is cold and in such a condition that the collar shaped gaskets 14 through 19 (FIGS. 3–8) become axially compressed and therefore being elastically deformed they react between the opposed ends of respective flanges and the perimetrical edges of the seats wherein the ends 11a of the casings are inserted.

As represented on the drawing and keeping unchanged the idea of substituting for the corrugated collar E an inserted resilient collar made of any suitable material, said collar shaped gaskets may assume different and appropriate shapes:

gasket 14 represented on FIG. 3 comprises two truncated cone sections, joined at their smaller bases, whereby under the compression stress, it tends to improve the seal both at the frontal edges and against its internal skirt which tightens the cylindrical skirt of the corresponding end 11a;

gasket 15 of FIG. 4 has a concave external skirt and reacts in the same way as the gasket represented on the preceding figure;

gaskets 16 and 17 of FIGS. 5 and 6, have corrugated external and/or internal skirts;

the gasket indicated by 18 on FIG. 7 has a cylindrical internal and external skirt;

gasket 19 represented on FIG. 8 has an helicoidal spring 19a embedded in its body and which has the object to increase the elasticity of the gasket in the longitudinal direction and to restrain in the same time the radial deformation of same.

Obviously, the variations of the shape of the resilient gasket represented are given only as illustrations and not limiting examples, keeping unchanged the substitution for the corrugated ends E of each casing, resilient gaskets however formed and applied on ends 11a of each casing.

What is claimed is:

1. For use between two engine parts each of which is provided with an opening and a surface surrounding the opening, the two surfaces facing each other, a tappet rod casing assembly comprising:
   a. a tubular casing having two ends, each of the ends being adapted to fit slidably through one of the openings in the engine parts,
   b. a pair of flanges projecting outwardly from the casing, each flange being near but spaced from one of the ends of the casing, and
   c. a pair of resilient collars, each collar surrounding a portion of the casing between one of the flanges and the casing end closest to that flange, and each collar when in an unstressed condition having a length measured along the length of the casing greater than the greatest thickness of the collar wall so that each collar has considerable resilience in the longitudinal direction of the casing,
   d. the casing and collars being so dimensioned that when the casing ends are inserted into the openings in the engine parts, each collar is longitudinally squeezed between its respective flange and the opposed surface of the engine part surrounding the respective opening.

2. A tappet rod casing assembly as defined in claim 1 wherein each of said flanges has a frusto-conical shape diverging toward the end of the casing to which the flange is closest.

3. A tappet rod casing assembly as defined in claim 1 wherein each of said flanges is flat and lies in a plane perpendicular to the axis of the casing.

4. A tappet rod casing assembly as defined in claim 1 wherein the wall of each of said collars converges longitudinally from both ends toward its center so that the collar has a smaller diameter at its center than at either end.

5. A tappet rod casing assembly as defined in claim 1 wherein the outer surface of the wall of each collar is concave.

6. A tappet rod casing assembly as defined in claim 1 wherein the outer surface of the wall of each collar is corrugated, the ridges of the corrugations extending circumferentially around the collar.

7. A tappet rod casing assembly as defined in claim 1 wherein the inner and outer surfaces of the wall of each collar are corrugated, the ridges of the corrugations extending circumferentially around the collar.

8. A tappet rod casing assembly as defined in claim 1 wherein the inner and outer surfaces of the wall of each collar are cylindrical.

9. A tappet rod casing assembly as defined in claim 1 including a helical metal spring embedded in the wall of each collar.

* * * * *